(12) United States Patent
Pearson

(10) Patent No.: US 6,767,375 B1
(45) Date of Patent: Jul. 27, 2004

(54) BIOMASS REACTOR FOR PRODUCING GAS

(76) Inventor: Larry E. Pearson, 12 Rolling Green Cir., Winona, MS (US) 38967

(*) Notice: Subject to any disclaimer, the term of this patent is extended or adjusted under 35 U.S.C. 154(b) by 863 days.

(21) Appl. No.: 09/649,463

(22) Filed: Aug. 25, 2000

Related U.S. Application Data

(60) Provisional application No. 60/150,661, filed on Aug. 25, 1999.

(51) Int. Cl.[7] .................................................. C10J 3/00
(52) U.S. Cl. .......................................................... 48/111
(58) Field of Search .......................... 48/61, 62 R, 73, 48/77, 89, 101, 111, 119, 202, 209, 210, 197 FM; 422/188, 189, 190, 196, 197, 198, 204, 232, 233, 234

(56) References Cited

U.S. PATENT DOCUMENTS 4,499,055 A * 2/1985 DiNicolantonio et al. .. 422/197
5,866,072 A * 2/1999 Bowe et al. ................... 422/78

* cited by examiner

Primary Examiner—Samuel M. Heinrich
(74) Attorney, Agent, or Firm—Wyatt, Tarrant & Combs, LLP

(57) ABSTRACT

Apparatus for producing synthesis gas from a biomass feed in a closed, helical coil reactor fired by at least a natural gas fed burner. The reactor includes the helical coil disposed concentrically in the reactor vessel with a burner positioned at the bottom of the vessel and a generally cylindrical heat shield, with the bottom end (facing the burner) being closed at the top of the vessel. The heat shield is concentrically disposed within the coil, and they are placed adjacent to, but spaced from, the sidewall of the vessel so that convective heat may flow upwardly and around the individual coils. The lower section of the coils are exposed tot he direct heat of the burner. The placement of the burner and heat shield provide respective heating zones to facilitate and control the heat supplied to the biomass for pyrolysis, reduction of char and bringing the target synthesis gas to equilibrium. Advantageously, a pressurized mixing vessel for pressurized feed of the biomass to the reactor coil is coupled to the input of the reactor. Likewise, addition of a secondary reactor will enable greater flexibility in the operation of the reactor coil in respect to particular gas products which can be formed and in the operating conditions to reach such product gas.

10 Claims, 3 Drawing Sheets

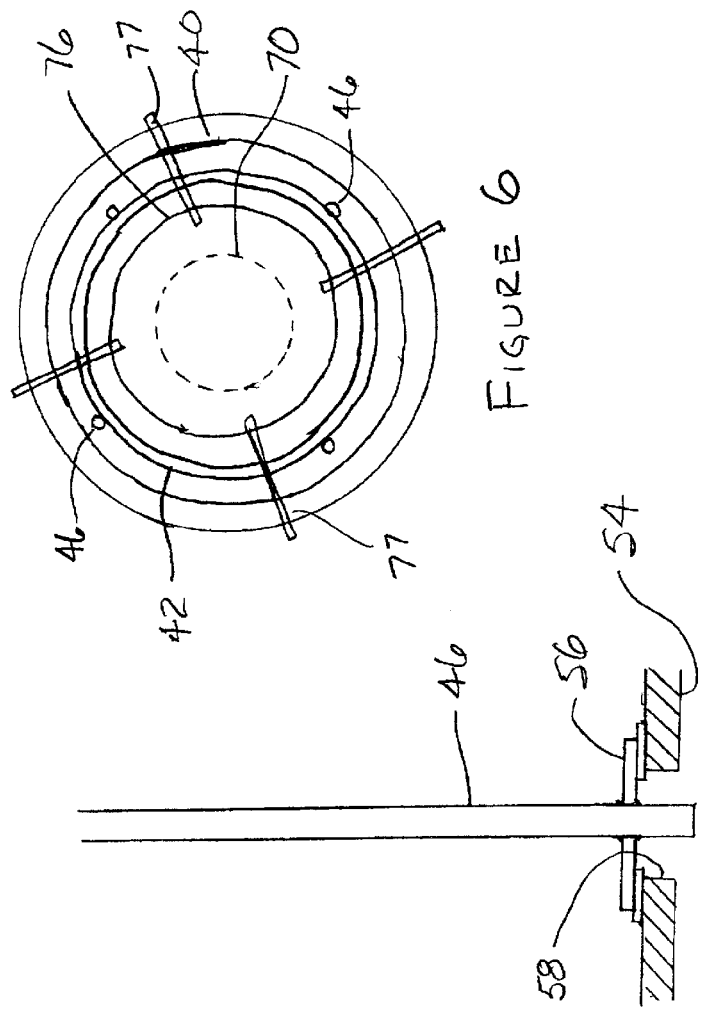
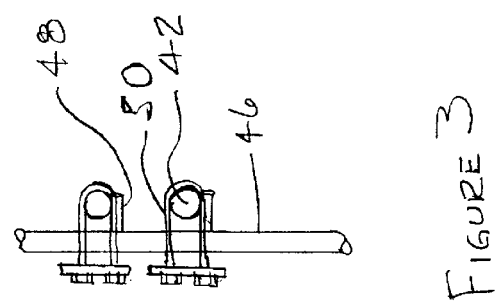

BIOMASS REACTOR FOR PRODUCING GAS

CROSS-REFERENCE TO RELATED APPLICATIONS

This Application claims priority of Provisional Application Ser. No. 60/150,661, filed Aug. 25, 1999.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved gasifier/reactor fed by a biomass of cellulosic material such as granulated wood, rice hulls, chopped cane and the like, for the production of a gas selectively rich in carbon containing components such as carbon monoxide, carbon dioxide, hydrogen and methane which in turn may be converted into a selected end product fuel such as methanol or ethanol, or as a feed gas for an industrial power plant.

2. General Background of the Invention

Gasification of wood, wood chips including sawdust, wood charcoal and other particulate cellulosic materials have become of increasing interest and importance because of the volatility of petroleum prices, dwindling of fossil fuels such as domestic petroleum and natural gas resources, and the increased dependence of the United States on international imports of these fuels. Gasification of coal and biomass has been practiced for over 100 years, and there are many varieties and types of gasifiers and methods of gasification.

In the instance of gasification of wood, wood chips and wood charcoal and other similar biomass fuels for the production of gas rich in combustibles, static grates or the equivalent have been utilized for supporting the fuel bed of progressively carbonized material and distributing the air, steam or other transport gas to support the pyrolysis gasification process. Vessels that have traditionally been used successfully for gasifing granular biomass such as wood chips and similar cellulosic material have been cylindrical, or somewhat wider or narrower at the grate level than at the surface of the fuel bed, according to the flow of feed and the forced air (or other gas) draft. Concerns with the settling of the fuel bed so that combustion takes place without the need to poke or otherwise stir the fuel bed have provoked a variety of vessel construction, none of which lend themselves to well to a high volume, precisely controlled, continuous process wherein the biomass fuel is efficiently converted to the target gas for supply to conversion into the ultimate fuel to be marketed or used. Prior art gasifiers have traditionally been large structures of brick and mortar, including complicated feed, blower and control systems. U.S. Pat. No. 5,551,958 to Antal; U.S. Pat. No. 5,507,846 to Coffman; U.S. Pat. No. 5,486,269 to Nilsson; U.S. Pat. No. 5,226,927 to Rundstrom; U.S. Pat. No. 4,655,891 to Atwood; U.S. Pat. No. 4,498,909 to Milner, et al; and U.S. Pat. No. 4,385,905 to Tuckerare illustrative of the various reactors and processes which have been utilized for the conversion of biomaterials to a syngas. U.S. Pat. No. 1,901,170 to Karrick discloses the use of a helical coil in a closed loop for gasification of coal and coke, however the operation of such a unit with biomass material is unclear. Necessary feed and mixing mechanisms and gasifier structure for the range of temperatures, pressures and through rates are not disclosed or suggested.

Gasification of biomass fuels falls into one or more of the following categories: pyrolysis, air gasification, oxygen gasification and anaerobic digestion. Pyrolysis is the breakdown of the biomass by heat at elevated temperatures (400° F. to 1200° F.) to yield an intermediate gas which is ultimately transformed into a market fuel (gas or liquid such as methane or ethanol). The intermediate gas produced is dependent upon the feed source and the speed and temperature at which the pyrolysis occurs. Fast pyrolysis of finely divided biomass results in maximum intermediate (synthesis gas) gas yields. Inclusion of such as oxygen or steam during the pyrolysis assists in the production of an intermediate gas containing carbon monoxide, carbon dioxide and hydrogen, useful in later conversion into such as ethanol, methanol, ammonia or methane. Other gas additions such as air or nitrogen may be used for synthesis gas having other make-up required for different end products. Anaerobic digestion may be utilized (usually in a secondary reactor) to facilitate various means for the conversion of the intermediate gas into one or more of these final fuels or products.

The difficulties in gasification is the conversion of all of the elements comprising the biomass fuel into gases containing the highest amounts of energy, for later conversion into the final products and the minimization of ash and char. In certain biomass fuels, gasification at lower temperatures produces oils and char requiring additional processing and likely, additional energy or waste in the process. Exposing the base fuel during the pyrolysis to air, water vapor or other components has a direct impact upon the products of pyrolysis, as does the temperature of the process and the duration thereof. By using any of the processes of the prior art, such as the fluidized bed, which is, at least, initially exposed to air and can be additionally exposed to such as oxygen, or others of the described input gasses, some portion of the fuel for gasification is consumed, as by oxidation (burning) effecting the output of the process by producing ash or other undesirable residue. Likewise, the startling size and complexity of installations for the effective production of synthesis gas are illustrated in the above cited patents.

BRIEF SUMMARY OF THE INVENTION

The present invention provides an improved method and apparatus for producing a synthesis gas from a biomass feed. In particular the present invention incorporates a reactor vessel heated, at least in part, by an external source such as natural gas, and the reactor vessel includes a helical coil of many turns carrying the biomass feed and the transport gas which are disposed adjacent the sidewall of the vessel, allowing an air gap between the coil and the vessel to permit convective heating. The coil receives a feed of biomass material, in ground or granulated form which is mixed and transported through the reactor coil by a transport gas. The transport gas may provide heat and chemical support to the pyrolysis process in addition to the externally supplied heat which transforms the biomass material into a target synthesis gas in the reactor coil. The rate and control over the pyrolysis process in the coil are effected by the inclusion of separated radiant and convective heat zones in the reactor vessel, the zones being defined by a cylindrical heat shield disposed in the vessel, concentrically of the coil, and in the uppermost region of the vessel, above the burner fed by the natural gas. The cylindrical heat shield preferably includes a truncated conical section at the bottom of the cylinder (closed at the end toward the burner) to better establish the transition between the zones and facilitate the convective heating in that zone.

Preferably, the reactor vessel includes a pressurized mixing chamber in which the biomass feed material is mixed and supplied to the reactor coil. Heating of the biomass by a transport gas which also may facilitate the pyrolysis, such as superheated steam enhances the mixing and feed of the biomass through the reactor coil to produce the synthesis gas.

The inclusion of a secondary reactor on the output of the innovative reactor provides further flexibility in the manufacture of the synthesis gas or a product gas or fuel.

BRIEF DESCRIPTION OF THE DRAWINGS

FIG. 3 is a partial view of mounting apparatus for the reactor coil of the present invention.

FIG. 4 is a partial view, in section, of mounting apparatus of the reactor coil support frame of the present invention.

FIG. 5 is a top view of the support frame for the reactor coil of the present invention.

FIG. 6 is a top view of the reactor coil, support frame and heat shield of the present invention.

DETAILED DESCRIPTION OF THE INVENTION

The output of the biomass gasifier is a combustible gas commonly referred to as synthesis gas, or "syngas" and is composed primarily of carbon monoxide and hydrogen but may also include significant concentrations of methane and carbon dioxide. This syngas is utilized for chemical synthesis or to make such as methanol, ethanol, ammonia, hydrogen, and methane. The present invention is particularly effective for producing such as methanol and ethanol. Likewise, while biomass reactors utilize various organic materials from manure to wood to rice and sugar cane hulls, the present invention is particularly useful with a feed of sawdust, as will be discussed below. It should be appreciated however, that the present invention is sufficiently versatile to utilize these other biomass feeds whether for producing fuels such as methanol or ethanol, or for feed gas for an industrial application such as steam or electricity. Likewise, it should be appreciated that the effectiveness of the present invention is not predicated upon a large size or particular critical mass in order to provide the effective output of syngas. Systems may be readily scaled up or down to produce as little as 400 pounds of gas per day or in excess of several thousands or tens of thousands of pounds per day, through straightforward scale-up or scale-down.

Figure 1:
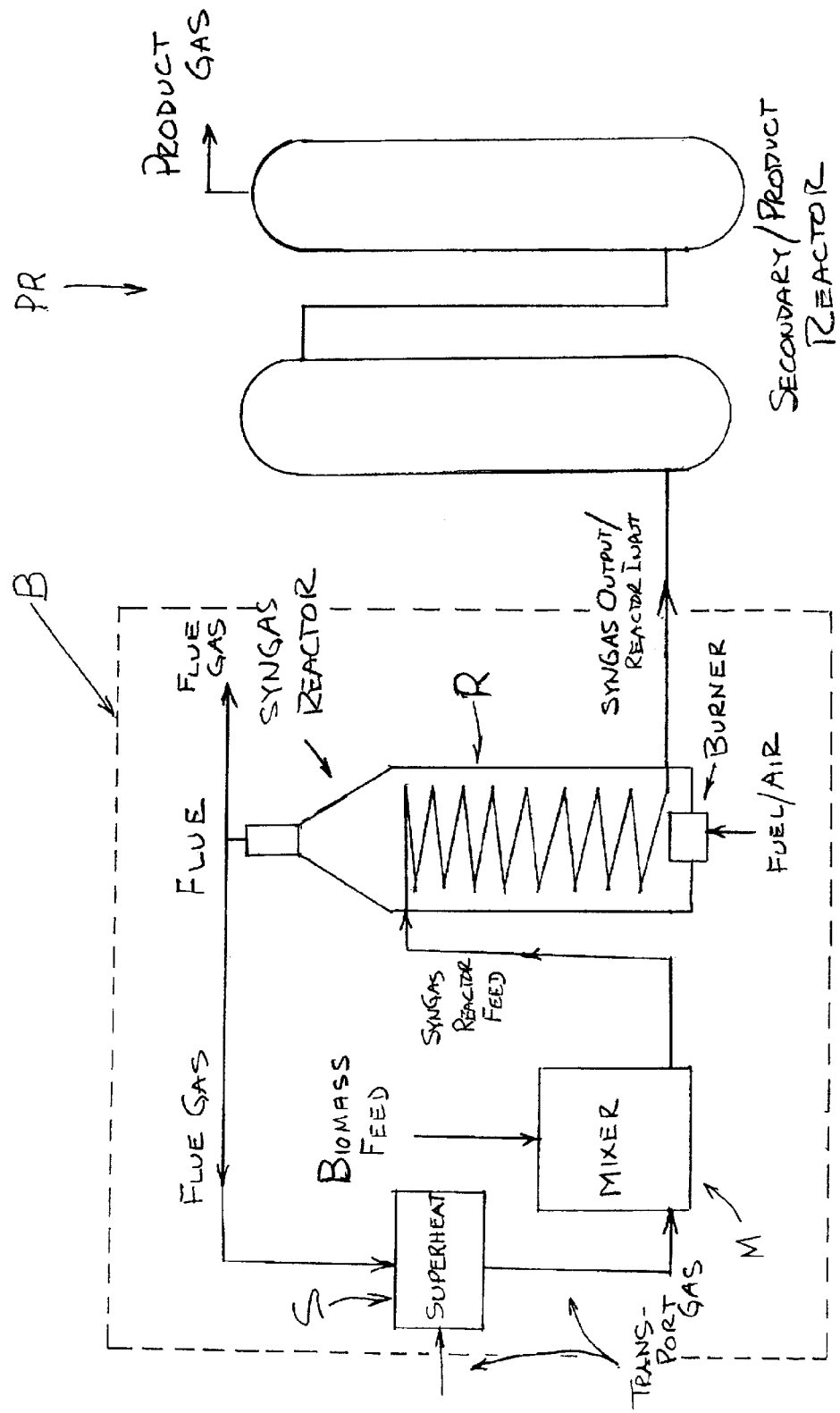
FIG. 1 is a diagrammatic view of the biomass gasifier according to the present invention.

Biomass gasifier B includes as main elements, mixing spool M and the gasifier/reactor R. FIG. 1 also discloses a superheater S on the input side of the mixing spool M. As is illustrated, the biomass feed, which in the preferred embodiment is sawdust, as produced at commercial sawmills in the production of lumber for furniture or building materials, is fed to mixing spool M from above, as is later described. A transport gas utilized to mix and transport the biomass feed, and carry it to the gasifier R is input to the mixing spool M. In the present embodiment, the transport gas is steam which is preferably superheated to about 1000° F. by superheater S before being injected into the mixing spool M.

Output of the mixing spool M, being a mixture of superheated steam and sawdust (heated to the temperature of the steam) in the illustrated embodiment, is supplied to the gasifier R, at the top thereof. The input of steam and sawdust transits the gasifier R as described below and after pyrolysis and char transformation, is output as a syngas for utilization according to an intended end product. As indicated above, the syngas is conventionally utilized for chemical synthesis or a combustible liquid or gas or ammonia. In the present embodiment, gasifier R is adapted to produce a syngas structured for the production of methanol, though with minor modification is readily adapted for the production of ethanol. Production of a variety of such specific products may be more efficiently accomplished by the inclusion of a secondary reactor PR for further processing the gas to an equilibrium, as is known in the art. The process of producing syngas with other biomass feed sources is similar, varying only in the parameters of the transport gas to get the biomass to a suitable temperature and dryness for pyrolysis, and adjusting the make-up of the components of the syngas produced.

Figure 2:
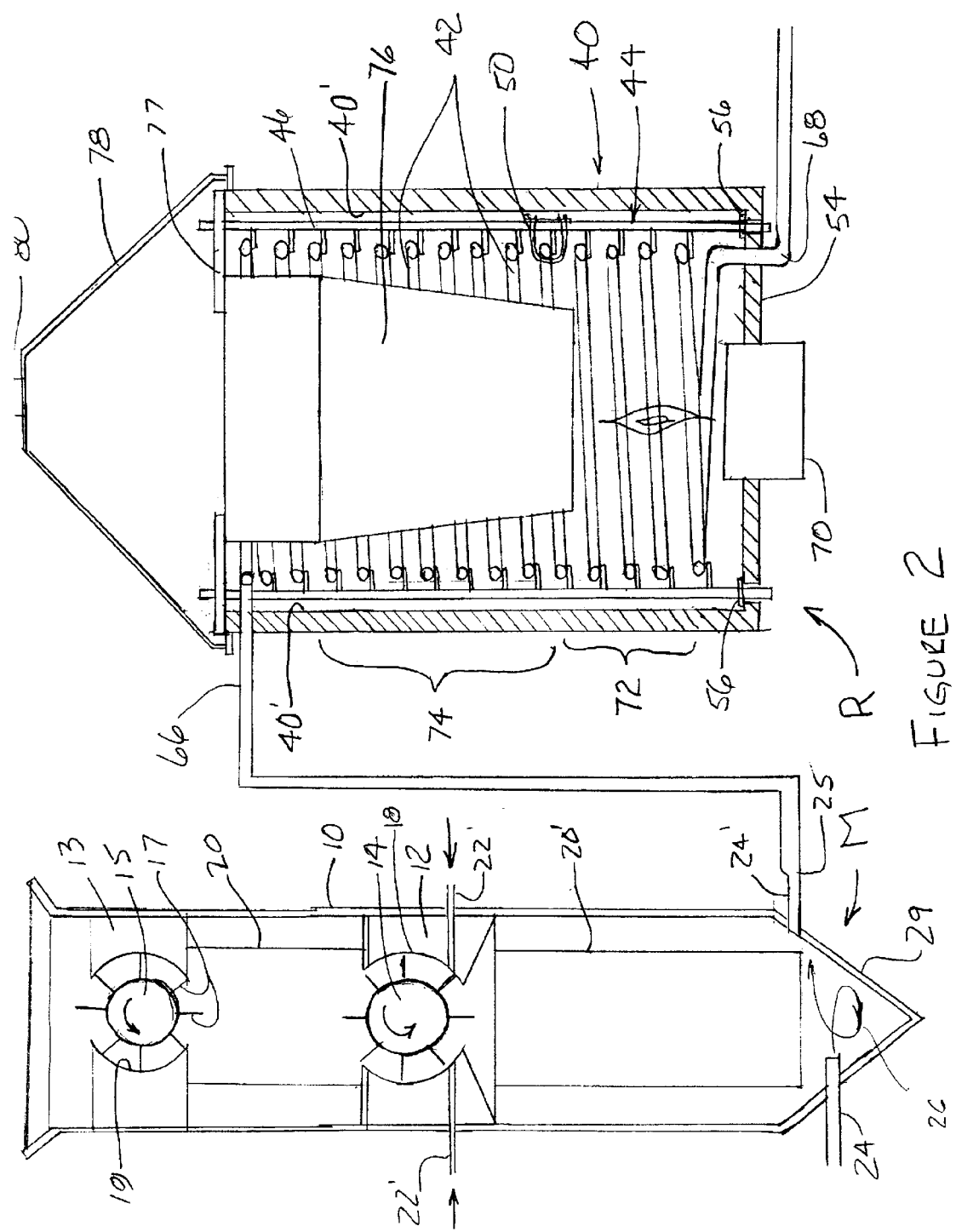
FIG. 2 is a front elevational view (partially in section of a preferred embodiment of the mixing spool and biomass gasifier of the present invention.

Referring now to FIG. 2, the details of mixing spool M and gasifier R are illustrated. Wood (sawdust) is introduced from hopper 10 through a specially constructed pressurized rotary valve 12, being a conventional vaned rotary valve having a diameter of about 18 inches, such as a Fuller-Kovako HP 30 rotary feeder. Rotary valve 12 includes a rotatable hub 14 having attached thereto radial vanes 16 which are disposed closely adjacent cylindrical sidewalls 18 of valve 12 and serves to maintain the pressure in mixing spool M. Hopper 10 contains bulk sawdust or other selected biomass feed, which is supplied to rotary valve 12 by means of a conventional metering rotary valve 13 feeding the amount of biomass feed to hopper 10 as required for a particular syngas output. Metering valve 13 has a somewhat similar construction to valve 12, including hub 15 and radial vanes 17 which are disposed closely adjacent cylindrical walls 19 of valve 13. In order to ensure that no buildup of biomass feed occurs in hopper 10 at valve 12, rotary valve 12 is operated at a higher RPM than metering valve 13. As noted, the function of pressurized rotary valve 12 is to seal the interior of mixing spool M to the atmosphere since the pressurized feed of mixed biomass and transport gas go directly from mixing spool M to gasifier R. The metered biomass feed is pumped into the mixing spool M by means of rotating hub 14, which is rotated by means such as an electric motor (not shown) to facilitate the supply of sawdust in being moved into drop tube 20 to the bottom of mixing spool M. Star valve 13 and rotary valve 12 are connected by drop tube 20 which isolates the biomass feed as it transits to and through rotary valve 12. The mating of vanes 16 with sidewalls 18 of rotary valve 12 is such that a seal against backpressure of at least produced by the pressure of the incoming transport gas to prevent overheating of the rotary valve 12. Facilitating the seal and the feed of the sawdust, a purge gas is specially supplied to rotary valve 12 through conduits 22' and 22" located preferably in the lower region of valve 12 adjacent the drop tube 20'. Where rotary valve 12 operates in the counterclockwise direction illustrated, purge gas entering through conduit 22' expands the incoming biomass (i.e., sawdust) preventing the transport gas (i.e., steam) from plugging or hampering the discharge of the biomass feed. Similarly, the supply of purge gas from conduit 22" fills the volume between adjacent vanes 16 retarding any flow of transport gas and biomass from back flowing into the "exit" side of rotary valve 12. The flow of purge gas in and around rotary valve also contributes to maintaining the rotary valve 12 at a safe operating temperature, thereby avoiding the need for special high temperature components. The purge gas may be cooled, dried flue gases from gasifier reactor R, or carbon dioxide or nitrogen, as desired. In the illustrated embodiment, two rotary valves, 12 and 13, are illustrated for the metering of biomass feed and pressure maintenance in mixing spool M, however, a single rotary valve may be utilized at the expense of additional effort to maintain feed rate and pressurization.

Transport gas, being superheated steam in the illustrated preferred embodiment, enters mixing spool M through entry conduit 24 and mixes with the biomass feed (sawdust) in the lower reaches of mixing spool M as illustrated by arrow 26. In order to affect the swirling motion depicted, conduit 24' is positioned tangentially to the inner wall 28 of mixing spool M in the conical mixing chamber 30, whereby as the pressurized transport gas causes the swirling motion as it follows the outer radius of the inner wall 28. In order to ensure the steam/sawdust mixture remains in the mixing chamber 30, and does not drift upwardly toward rotary valve 12, for clear exit at output conduit 24', drop tube 20 extends into mixing chamber to just above steam input conduit 24. In the illustrated embodiment utilizing a biomass feed of sawdust, the temperature of the steam transport gas is on the order of 1000° F. and a pressure of about 25 to 50 psi in input conduit 24 approaching mixing spool M. As the transport gas enters mixing spool M, conduit 24 vents the transport gas tangentially adjacent the conical mixing chamber 30, disposed below the drop tube 20. The action of the transport gas expanding as it exits conduit 24 causes additional mixing action with the biomass fuel as they tend to rise up the increasing diameter of mixing chamber 30, keeping the bottom of the cone clear of sawdust. The transport gas (superheated steam) serves to raise the temperature of the biomass feed above its dew point to ensure that there is no condensation occurring in the transport gas/biomass feed, since any condensation would allow plugging or uneven flow of the mixture and transport gas. Pressure of the transport gas and biomass mixture in the interior of mixing spool M is about 25 to 50 psi according to the desired feed rate of biomass and throughput time for the chemical transformation to the target synthesis gas to be produced in gasifier R. As the swirling mixture passes exit conduit 24', it exits, heading toward gasifier reactor R. En route in conduit 24', the mixture passes through reducer 25, which in the illustrated embodiment is an eccentric transition of conduit 24' from a 2 inch diameter to a 3 inch diameter (being the diameter of helical coil 42 of gasifier R), reducing and slowing the flow of the mixture about to enter gasifier reactor R. An eccentric reducer is preferably utilized to ensure no settling, trapping or collecting of biomass feed at the reducer 25.

FIG. 2 also illustrates the biomass gasifier R which consists of an insulated vessel 40 having disposed therein a helical coil 42 being centrally located in vessel 40, with individual coils 42' disposed generally adjacent, but not in contact with, sidewall 40' of vessel 40. Coil 42 is supported by a floating frame 44, which in the illustrated embodiment consists of at least four vertical tubes 46 fabricated of high temperature material, such as 304 or 310 stainless steel or equivalent (310 stainless is preferred when the component is exposed to the radiant heat of the burner 70). Tubes 46 are symmetrically placed around individual coil loops 42' and have individual support stations 48 disposed thereon, symmetrically spaced vertically in order to provide a substantially uniform helix through its extent within vessel 40. Individual clamps 5 (310 stainless or equivalent), disposed on tubes 46 adjacent support stations 48 encircle individual loops 42' of coil 42 to retain coil centrally located on frame 44 at the respective support stations. Clamps 50 are conveniently U-shaped (i.e., U-bolts) and fabricated of a high temperature tubular material (310 stainless or equivalent) and are loosely secured around individual loops of coil 42 (as better illustrated in FIG. 3) to enable the coil 42 to expand and contract under the swing of temperature within vessel 40 as it comes up to operating temperature and again as it cools down when secured. Floating frame 44 is mounted in the base 54 of vessel 40 in a donut-shaped moveable mount 56 which may be welded or otherwise fixedly secured to tube 46 adjacent the end of the tube 46. Tubes 46 are disposed and retained in holes 58 (preferably circular and of a diameter to allow movement of frame 44, as at tubes 46 to accommodate for expansion and contraction of coil 42 during heating and cooling) in base 54. Holes 58 are surrounded with a bearing plate 60 (preferably circular in shape and complementary to mount 56) such that the weight of coil 42 and frame 44 including tubes are supported on base 54 at bearing plate 58. By supporting coil 42 with tubes 46 vented outside vessel 40, cooling gas may allow the utilization of lower temperature materials, particularly in the intensely heated radiant zone of the vessel 40.

Biomass gasifier R receives the transport gas supporting the biomass at intake 66 disposed at the top of insulated vessel 40 to coil 42. The combination of transport gas and biomass travel helically down the coil 42 until the product of the gasification exits the biomass gasifier R at exit port 68 adjacent base of vessel 40. While in the coil, the high velocities and centrifugal action of the traveling mixture cause it to be further mixed and homogenized. Burner 70, powered preferably by an external fuel, such as natural gas, provides direct, radiant heat to coil and the mixture therein in the radiant heat zone, as indicated at 72, to carry out the gasification process, as later described. Above the radiant heat zone 72 is convective heat zone 74 wherein predominant heating of coil 42 and the contents is by the heat rising out of the radiant heat zone and adjacent vessel wall 40' and heat shield 76. Heat shield 76 is disposed concentrically in coil 42 above the zone of effective radiant heating 72 by burner 70 and is fabricated of a high temperature material (310 stainless or equivalent). Preferably heat shield 76 is in the shape of a truncated cone 76" disposed at the lower end of a cylinder 76', closed at the minor base, the varying diameter of which progressively increases from the radiant heat zone 72 toward the cylindrical portion 76' which extends to slightly above the top of vessel 40 and coil 42. The shape of heat shield 76 is coordinated to maximize the transfer of convective heat to coil 42 over the convective heat zone 74 as the hot flue gases rise through vessel from the burner 70 to hood 78 and flue pipe 80. Truncated cone 76" provides a more efficient use of the combination of the radiant and convective heat in the transition from their respective zones 72 and 74. Heat shield 76 is suspended concentrically in coil 42 as by being attached to and hung from several symmetrically placed studs 77 disposed on the top of vessel 40. Hood 78 is conveniently to supported on vessel 40 by means such as support ring 79, fixed to the upper, outer wall 40" of vessel 40. Flue 80 carries off the exhausts of combustion at burner 70, and may include supply of such flue gas for purge gas or as otherwise described.

The specific reactions which occur in the inventive biomass gasifier are similar to the reactions performed in other types of gasifiers (such as fluidized bed) being a combination of drying, pyrolysis, reforming gasification and thermal degradation. The resulting gas composition is determined by the temperature, pressure, residence time, biomass/steam (or other transport gas) ratio, biomass/transport gas ratio, the type of gas used for transport, and the biomass ultimate composition. Since most biomass materials require oxygen in addition to that contained in the biomass material used, the additive oxygen is preferably selected based upon other elements necessarily added to obtain the desired composition of the syngas produced. In the present invention it should be recognized that (because of the totally closed system) the only elements available for the manufacture of syngas are those included in the make-up of the biomass feed and the transport gas. The illustrated embodiment of a biomass gasifier is effective to directly produce syngas suitable for the production of ethanol or methanol however, may more effectively utilize a secondary reactor to reach the equilibrium product gas. Accordingly, steam or carbon dioxide are the preferable transport gases, thereby maximizing the carbon and hydrogen components as well as supplying additional oxygen. Hydrogen might also be a suitable transport gas, but it is harder to handle and less cost efficient. Where the syngas is to be used as the input for the production of ammonia, nitrogen or air might be preferable transport gasses. Those skilled in the art may recognize the suitable additives, depending upon the ultimate use of the syngas produced in the gasifier R. What should be recognized of the inventive gasifier illustrated is that the system is totally closed to any input other than the biomass feed and the transport gas thereby enabling a much more accurate control over the formulation of the syngas product in the reactor. It should also be recognized that with a relatively high pressure of input transport gas and feed of a particulate such as sawdust produces a very rapid mixing and heating of the transport gas/biomass in the heating zones of gasifier R with the result that a high volume output is achieved, far exceeding the output of conventional plants of comparable physical size, and far exceeding the volume of output per cost of such conventional plants.

By way of example, for a gasification reactor of the described embodiment, adapted for the production of methanol, steam is used as the transport gas and is input at conduit 24 which is about 1 inch in diameter, to mixing spool M at a pressure of about 50 psi and a temperature of about 900° F. to 1000° F. The depth of the drop tube 20 is about 3 feet and is 2 to 3 feet in diameter. The depth of the conical mixing chamber 29 is about 8 inches. Pressurized rotary valve 12 and metering rotary valve 13 are each about 18 inches in diameter. The ratio of transport, in pounds, is about 1.0 of steam to 1.0 of sawdust, adjusted higher to balance output to component ratios. The grind size of the biomass feed is approximately 100% ⅛ inch or less and preferably the moisture content is between 10% and 15%. The residence time of the biomass/steam mixture in the gasifier is preferably as long as possible, in the range of about 0.5 to 2 seconds (particularly if a secondary reactor PR is used) however may be extended to five to ten times these values, depending upon the reactions (i.e., approach to equilibrium of the syngas components) to be accomplished in reactor coil 42 and also depending upon the biomass (sawdust) feed rate and the particular chemistry of the syngas desired to be produced. Those skilled in the art should recognize the shortness of the general dwell times of the reacting mixture as unrivaled by conventional systems. The exit gas temperature is approximately 1750° F. The target composition of the syngas produced is: hydrogen, about 50%; carbon monoxide, about 25%; carbon dioxide, about 20%; and methane, about 5%. During this process of gasification, approximately the top 10% of coil 42 acts as a drier operating at about 1500° F. to about 1750° F. to dry water out of the biomass to prepare it for the next steps of the process: devolatilization; pyrolysis; gasification (of char); water gas shift; methane reforming and such other related reactions as are necessary for the end product from a secondary reactor. As the biomass dries, the rising heat (from about 1750° F. To about 1950° F.) of the mixture in coil 42 as it transits the middle range boils off heavy liquids (tars, etc.) in the biomass and prepares the mixture for pyrolysis which occurs in the approximate final third of coil 42 at temperatures upwards to about 2200° F. In the illustrated embodiment, the radiant zone 72 extended over about one-half of the coil 42 and the convective zone 74 extended over the top half of coil 42. During that transit, thermal breakdown of the molecules of the biomass progresses to such as carbon monoxide, hydrogen, carbon dioxide and methane. The pyrolysis process is expedited to produce gas and char as contrasted to the production of liquids which occurs in slow pyrolysis. Any char produced is preferably gasified by converting it to carbon monoxide (as by the addition of water and also yielding hydrogen) or by the addition of carbon dioxide and yielding carbon monoxide. Rate of throughput of biomass, pressures and temperatures may be sufficiently varied and controlled to vary the output of the illustrated gasifier to as much as 9000 gallons of methanol from 60 tons of sawdust, daily. The illustrated embodiment had a coil tube 42' diameter of about 3 inches and the length of the coil is about 1000 feet, wound into a helical coil of about 8 feet in diameter and standing 20 to 25 feet high. The vessel 40 is about 10 feet in diameter and heat shield 76 has a nominal diameter of about 6 feet. Typical operation produced an exit velocity of the gas typically from about 500 feet per second to more than 1000 feet per second.

Depending upon the further processing of the syngas produced to this point, the process may additionally include the accomplishment of the water gas shift wherein water and carbon monoxide are converted to carbon dioxide and hydrogen. Likewise, methane re-forming may be accomplished wherein methane by the addition of water may be converted to carbon monoxide and hydrogen.

As stated above, natural gas is utilized to fuel burner 70 to provide the necessary heat to coil for the several reactions describe. It is alternatively possible to supplement the natural gas feed with the inert purge stream from the methanol loop. Some of the raw product gas from the biomass gasifier may be used to supplement the natural gas, depending upon the costs of natural gas and the relative efficiency of the gasifier (as dictated by the quality of the biomass feed).

In the instance of the utilization of the illustrated biomass gasifier to provide the heat for an industrial power plant for steam and/or electrical energy production, the goal is to produce a syngas with as high a heat value as is possible. This type of syngas is characterized by maximizing carbon monoxide, methane and aliphatics. Consistent with this goal, it is imperative that the high heat value is produced with minimal aromatics and/or heavy organics, which are prone to condense to liquid in the system and foul or contaminate it. Close coupling of the biomass gasifier to the power generating equipment (i.e., boiler or turbine) helps in that the syngas is burned before the aromatics or organics condense.

In the instance of producing a syngas for power production, the target syngas will be: hydrogen, about 5–10%; carbon monoxide, about 60%; carbon dioxide, about 10–15%; and methane, about 15–20%. The system operating parameters will be: transport steam, about 900°–1000° F. (though it may be preferable to utilize carbon dioxide alone or in addition to steam—the selection is dependent upon the quality of the biomass feed and the need to reduce char); the biomass utilized is more optional in that various woods, rice hulls and bagasse are among possible fuels. The ambient temperature, grain size, moisture are similar to that for methanol, and basically determined by the feedability of the biomass. The feed rates call for less steam, about 0.5 to 1 of biomass, in pounds though for carbon dioxide the feed rate may be up to 1.25 to 1. The exit gas temperature from the biomass gasifier will be about 1500° F. and the output may be directly usable as the feed fuel for the boiler, eliminating any need for a secondary reactor for further refinement of the syngas. Contact time in the biomass gasifier are characteristically lower if a secondary reactor is utilized since some of the gas transformation may be preferably accomplished in the secondary reactor. In the instances of some syngas production, as for a fuel feed to a power plant, the syngas may not require the secondary refinement, in which case the contact time in the gasifier will be expected to be somewhat longer. Times for production of particular product gases from secondary reactors are related to the process employed to convert a syngas to the final product, and the dwell dime in the vessel may well be several times the time that for the syngas production in the illustrated invention.

It should be further recognized by those skilled in the art that gasifier reactors according to the presently described invention may be utilized in varying sizes to meet local needs relating to availability of biomass feed and output gas, particularly where the inventive gasifier might feed industrial plant needs for steam or electricity.

The disclosed embodiments are to be considered in all respects as illustrative and not restrictive. The scope of the invention is to be defined by the appended claims rather than the foregoing descriptions. Other embodiments which come into the meaning and range of equivalency of the claims are therefore intended to be included within the scope thereof.

Accordingly, I claim:

1. Apparatus for producing synthesis gas by pyrolysis of a biomass feed transported through a closed reactor coil in a reactor vessel comprising:

a) a vertically extending cylindrical reactor vessel having a top portion and a bottom portion and a cylindrical sidewall therebetween, said top portion including a hood and a flue vent;

b) a helical reactor coil disposed vertically in said vessel below said top portion, said reactor having an input end and an output end;

c) said input end of said reactor coil disposed below said top portion and said output end disposed below said bottom portion;

d) a burner for providing the heat for pyrolysis disposed in Said bottom portion of said vessel e) a generally cylindrical heat shield disposed generally concentrically within said coil and above said burner in at least the upper one-third of said vessel, the end of said cylindrical heat shield disposed toward said burner being closed;

f) whereby said heat shield defines a zone of convective heating for said coil by the heat from said burner in the region where said coil is adjacent said shield, and a radiant heating zone in the region where said coil is directly exposed to the heat produced by said burner.

2. The apparatus of claim 1 wherein said cylindrical heat shield has a bottom portion including a truncated cone.

3. The apparatus of claim 1 wherein said reactor includes a pressurized mixing vessel for supplying biomass feed to said reactor coil.

4. The apparatus of claim 3 wherein said mixing vessel is pressurized by a transport gas and said transport gas carries said biomass feed to said reactor coil.

5. The apparatus of claim 3 wherein said mixing vessel includes a generally conical mixing chamber disposed at the bottom of said mixing vessel.

6. The apparatus of claim 5 wherein said transport gas is input to said mixing vessel in said conical mixing chamber, tangentially thereto.

7. The apparatus of claim 3 wherein said mixing vessel has a rotary valve disposed at the top of said vessel for the input of biomass feed.

8. The apparatus of claim 7 wherein said rotary valve is pressurized with a purge gas whereby said rotary valve is cooled by said purge gas.

9. The apparatus of claim 1 wherein said reactor includes a secondary reactor connected to the output of said reactor for completing the conversion of said biomass to an equilibrium gas.

10. The apparatus of claim 9 wherein said reactor includes a pressurized mixing vessel for supplying biomass feed to said reactor coil.

* * * * *